S. P. STEIN.
WAVE POWER AIR COMPRESSOR.
APPLICATION FILED JAN. 24, 1918.

1,358,259.

Patented Nov. 9, 1920.
2 SHEETS—SHEET 1.

WITNESS:
Howard P. King

INVENTOR:
Samuel P. Stein,
BY
ATTORNEY.

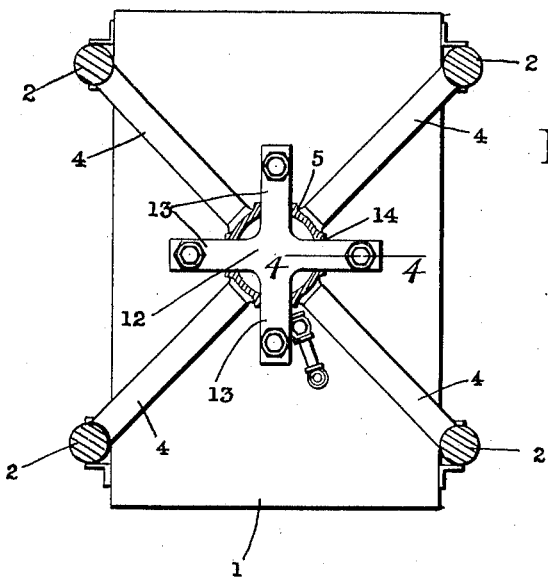
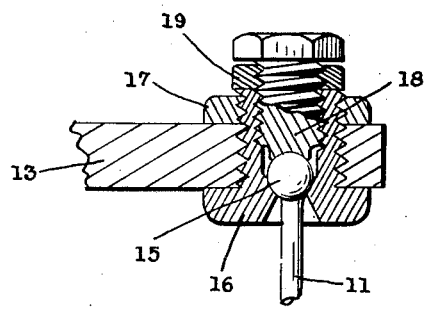

UNITED STATES PATENT OFFICE.

SAMUEL P. STEIN, OF NEWARK, NEW JERSEY, ASSIGNOR TO THE STEIN INTERNATIONAL POWER CO., OF NEWARK, NEW JERSEY, A CORPORATION OF NEW JERSEY.

WAVE-POWER AIR-COMPRESSOR.

1,358,259.  Specification of Letters Patent.  Patented Nov. 9, 1920.

Application filed January 24, 1918. Serial No. 213,585.

*To all whom it may concern:*

Be it known that I, SAMUEL P. STEIN, a citizen of the United States, and a resident of Newark, in the county of Essex and State of New Jersey, have invented new and useful Improvements in Wave-Power Air-Compressors, of which the following is a specification.

The objects of this invention are to provide an improved wave power air compressor in which a direct lift is secured for the air compressing piston with the lifting means applied other than through the bottom of the compressing cylinder; to apply the lifting means to the piston rod intermediate of opposed piston heads in the same cylinder or alined cylinders; to employ such a double-headed cylinder or cylinders arranged parallel to the direction of movement of the float or reciprocating member; to provide in such a structure a balanced arrangement of parts so that the operation of the float will have no tendency to bind the pistons within the cylinder; to permit the float to operate freely without injury to the parts so it will be unnecessary to accurately guide the float; to thus avoid the necessity of accurately ground or finished parts likely to be affected by the water; to provide improved means for storing the compressed air; to secure simplicity of construction and operation, and to obtain other advantages and results as may be brought out in the following description.

Referring to the accompanying drawings, in which like numerals of reference indicate the same parts throughout the several views, Figure 1 is a vertical central section of a wave power air compressor constructed in accordance with my invention;

Fig. 3 is a cross-sectional view on line 3—3 of Fig. 1;

Fig. 4 is a sectional view on line 4—4 of Fig. 3 and

Fig. 5 is a vertical sectional view of a series of tanks or containers for the compressed air.

Figure 1:
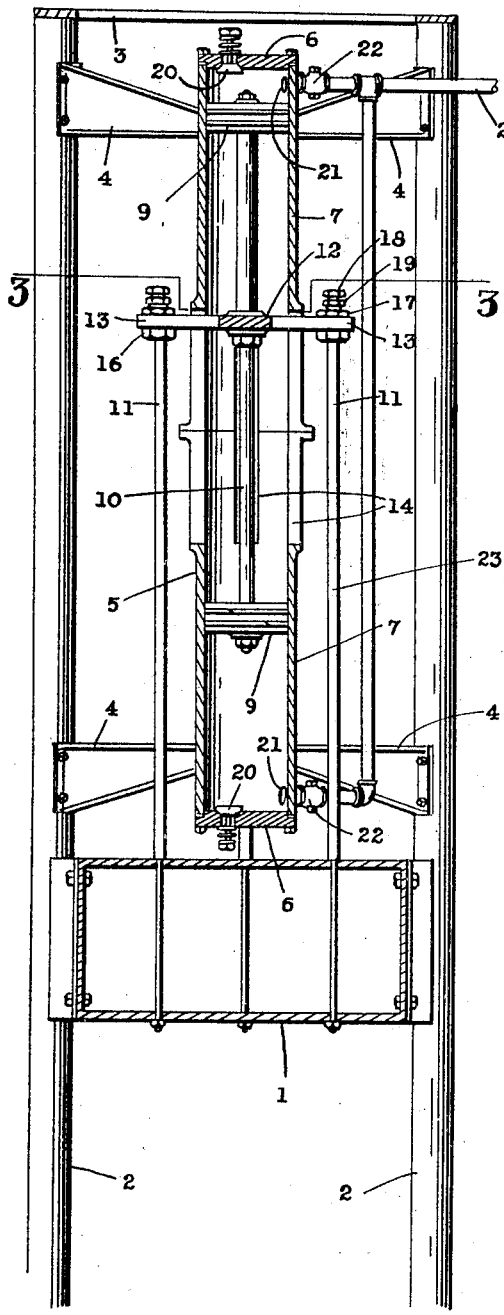
Figure 2:
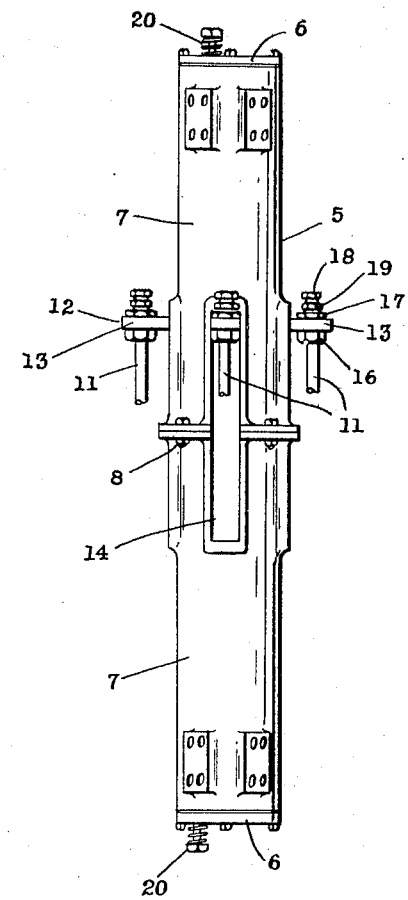
Fig. 2 is a view of the outside of the compressing cylinder.

In the specific embodiment of the invention illustrated in said drawings, the reference numeral 1 indicates a float adapted to be buoyed by the waves and restrained against material lateral movement by suitable upright ports or piles 2 driven in the bed of the ocean or other body of water. Preferably there are four such piles for the float, one adjacent each corner thereof, said piles being held in substantially parallel relation by suitable bracing such as indicated by 3. It is to be understood that the piles project above the normal range of movement of the float due to both the waves and the tide, and carried by such upper portion of the piles, as by brackets 4, is a cylinder 5 for compressing air. Preferably the cylinder 5 is double ended, that is, its opposite or upper and lower ends are both closed, as by heads 6, 6, the cylinder being separable intermediate said heads into piston cylinders or end sections 7, 7, normally bolted together end to end as at 8. A piston 9 operates within each cylinder section 7, said pistons being connected by a piston rod 10 so as to reciprocate simultaneously. Obviously upon the upstroke, air will be compressed in one cylinder section and upon the downstroke air will be compressed in the other cylinder section.

Means are provided for reciprocating the piston rod and piston as the float 1 rises and falls, such means preferably comprising a direct connection between the float and piston rod. That is, a connection is provided which has no tendency to jam the pistons more severely against one side of the cylinder than another. To this end, the direction of movement of the pistons and the direction of movement of the float are upon the same or parallel lines, and extensions 11 projecting upward from the float, preferably at opposite sides of the cylinder, will accordingly move parallel to the axis of the cylinder. A cross head 12 mounted upon the piston rods and extensions 11 transmits the upward lift and downward pull of the float to the piston rod without any lateral component of force. The cross head 12 preferably provides radially projecting arms 13 in a plane transverse to the axis of the cylinder with adjacent arms at right angles to each other.

These arms project through longitudinal slots 14 in the side of the cylinder, which slots are long enough to accommodate vertical movement of the head both for the maximum wave variation and the rise and fall of the tide. Furthermore, the slots 14 preferably have their longitudinal faces accurately finished so as to provide guideways for the arms 13 of the cross head 12. By this construction it is not necessary to accurately guide the float as slight deviation of the extensions 11 may be accommodated by the cross head without creating a lateral thrust of the pistons. It may further be noted that the finished guideways formed by the slots are well above the water level so as not to be affected thereby, and furthermore, reciprocation of opposed pistons is obtained without the use of a stuffing box in one end of the cylinder.

In order to accommodate the deviation of the extensions 11, a ball and socket attachment is preferably provided at their upper ends to the cross head. As may be seen in Fig. 4, each extension has a globular or ball end 15 carried in a bushing or socket member 16 threaded upward into the arm of the cross head and secured by a lock-nut 17 above the arm. A plug 18 screws into the upwardly open end of the bushing above the ball end 15 of the extension thus holding the ball in the socket, a locknut 19 holding the plug in adjusted position.

It is to be understood that suitable valved inlets and outlets are provided for the cylinder, inlet valves 20 being shown at opposite ends of the cylinder which will automatically close except when opened by decreased pressure in the cylinder as the piston retracts. The outlets 21, also at the closed ends of the cylinder, have check valves 22, 22 which will prevent the air forced from the cylinder from returning, the outlets being connected beyond the check valves by a pipe 23 in communication with a suitable reservoir as by a pipe 24.

The reservoir is preferably arranged to receive a large quantity of air under pressure but so stored that a small quantity is first put under the desired pressure for use and then more air added without material increase of pressure but with an increase of volume. To this end I preferably make the reservoir with a plurality of cells or compartments 25, 26 and 27, the second having a valved inlet 28 from the first, the third a valved inlet 29 from the second, and so on for any number of cells. The valves 30, 31 in said inlets are arranged to remain closed until the pressure in the tank being filled rises to the maximum storage pressure for that cell. Then the valve from the first to second cell will automatically open and admit the pressure to the second cell, said valve closing when the pressure in the first cell becomes less than the pressure in the second. When the second cell is filled to maximum pressure the third one is filled, and so on, the last cell, here shown as the third one, having a safety valve 32. Valved outlets 33, 34 from the third cell to the second cell and the second cell to the first cell are provided which will open to admit the air from the second to the first or the third to the second cell as the pressure in the first one filled becomes less than the pressure in the last one filled. In addition to the inlet pipe 24 from the cylinder to the first cell of the reservoir, said first cell has also an outlet 35 by means of which the air may be drawn off for any purpose, such as for operating an engine. Obviously, however, any use desired may be made of the air pressure without departing from the spirit or scope of the invention.

Having thus described the invention, what I claim is—

1. The combination of a float, means for guiding the same so as to rise and fall in a substantially vertical path under the action of the waves and the like, a cylinder above said float having a plurality of pairs of opposite longitudinal guideways in its side wall, a piston within said cylinder, a cross head for operating said piston having a plurality of pairs of opposite arms projecting through said guideways and guided thereby, and means connecting the projecting ends of said arms with the float so as to permit a limited lateral deviation of the latter in any direction.

2. The combination of a float, means for guiding the same so as to rise and fall in a substantially vertical path under the action of waves and the like, a cylinder above said float having longitudinal guideways in its side wall, a piston within said cylinder, a cross head for operating said piston having arms projecting through and guided in said guideways, and means connecting the ends of said arms to said float so as to permit a limited lateral deviation of the latter in any direction.

3. The combination of a float, means for guiding the same so as to rise and fall in a substantially vertical path under the action of waves and the like, a cylinder above said float having longitudinal guideways in its side wall, a piston within said cylinder, a cross head for operating said piston having arms projecting through and guided in said guideways, and means connected by a ball and socket joint to said cross head for reciprocating said piston by the float.

SAMUEL P. STEIN.